(12) United States Patent
Goodson, III et al.

(10) Patent No.: US 8,179,661 B2
(45) Date of Patent: May 15, 2012

(54) ORGANIC BRANCHED AND HYPERBRANCHED SYSTEMS FOR HIGH DIELECTRIC AND CAPACITANCE APPLICATIONS

(75) Inventors: Theodore Goodson, III, Ann Arbor, MI (US); Xingzhong Yan, Brookings, SD (US)

(73) Assignee: The Regents of The University of Michigan, Ann Arbor, MI (US)

( * ) Notice: Subject to any disclaimer, the term of this patent is extended or adjusted under 35 U.S.C. 154(b) by 992 days.

(21) Appl. No.: 12/215,667

(22) Filed: Jun. 27, 2008

(65) Prior Publication Data

US 2009/0002919 A1    Jan. 1, 2009

Related U.S. Application Data

(60) Provisional application No. 60/946,562, filed on Jun. 27, 2007.

(51) Int. Cl.
*H01G 4/06*    (2006.01)
*H01G 4/08*    (2006.01)
*H01G 4/30*    (2006.01)

(52) U.S. Cl. .................. 361/311; 361/323; 361/301.4

(58) Field of Classification Search ............. 361/311, 361/301.1, 301.4
See application file for complete search history.

(56) References Cited

FOREIGN PATENT DOCUMENTS

| | | |
|---|---|---|
| JP | 2005105193 | 4/2005 |
| JP | 2005105193 A * | 4/2005 |

OTHER PUBLICATIONS

Bao, Zhenan et al., Organic Field-Effect Transistors with High Mobility Based on Copper Phthalocyanine (Jun. 25, 1996), pp. 3066-3068.
Bhattacharya, Swapan K. et al., Next Generation Integral Passives: Materials, Processes, and Integration of Resistors and Capacitors on PWB Substrates (2000), pp. 253-268.
Chwang, Ching-Piou et al., Synthesis and Characterization of High Dielectric Constant Polyaniline/Polyurethane Blends (Aug. 4, 2003), pp. 275-281.
Dutta, P. et al., Dielectric Relaxation in Polyaniline-Polyvinyl Alcohol Composites (Aug. 20, 2001), pp. 193-200.
Goodson, III, T., Time-Resolved Spectroscopy of Organic Dendrimers and Branched Chromophores (Jul. 13, 2005), Contents and pp. 581-603.
Goodson, III, T.G., Optical Excitations in Organic Dendrimers Investigated by Time-Resolved and Nonlinear Optical Spectroscopy (Apr. 19, 2004), pp. 99-107.
Gu, Changzhi et al., High-Sensitivity Phthalocyanine LB Film Gas Sensor Based on Field Effect Transistors (1998), pp. 383-386.
Guo, Meng et al., High Frequency Dielectric Response in a Branched Phthalocyanine (May 30, 2006), pp. 14820-14821.

(Continued)

*Primary Examiner* — Eric Thomas
*Assistant Examiner* — Arun Ramaswamy
(74) *Attorney, Agent, or Firm* — Harness, Dickey & Pierce, P.L.C.

(57) ABSTRACT

An organic dielectric material comprises a branched and/or hyperbranched macromolecule having delocalized electrons. Such macro-molecular organic material systems have desirable delocalized charge and optionally one or more microcrystalline regions. Organic dielectric materials include, for example, branched polyanilines and phthalocyanines. Delocalized excitations within the macromolecular framework of the organic dielectric material may be used in various applications, such as light harvesting, nonlinear optical, quantum optical, and electronic applications, e.g., capacitors. Electrical devices may comprise such dielectric materials, including capacitors that have very high energy density, storage, and transfer. Also provided are methods of preparing such materials.

22 Claims, 14 Drawing Sheets

OTHER PUBLICATIONS

Hechner, J. et al., Effect of Copper Phthalocyanine Layer Thickness on Properties of SAW NO2 Sensor (Jul. 18, 2002), pp. 841-842.

Huang, Cheng et al., All-Organic Dielectric-Percolative Three-Component Composite Materials with High Electromechanical Response (Jan. 8, 2004), pp. 4391-4393.

Huang, Cheng et al., Fully Functionalized High-Dielectric-Constant Nanophase Polymers with High Electromechanical Response (2005), pp. 1153-1158.

Huang, Cheng et al., High-Dielectric-Constant All-Polymer Percolative Composites (Jan. 6, 2003), pp. 3502-3504.

Ishii, Masahiko et al., Influence of Temperature and Drive Current on Degradation Mechanisms in Organic Light-Emitting Diodes (Sep. 11, 2001), pp. 3430-3432.

Lee, S.T. et al., Interfacial Electronic Structures in an Organic Light-Emitting Diode (Jun. 15, 1998), pp. 670-672.

Liu, H. et al., Structure, Conductivity, and Thermopower of Crystalline Polyaniline Synthesized by the Ultrasonic Irradiation Polymerization Method (Nov. 6, 2001), pp. 9414-9419.

Newton, M.I. et al., NO2 Detection at Room Temperature with Copper Phthalocyanine Thin Film Devices (Jan. 3, 2000), pp. 307-311.

Oprea, A. et al., Copper Phthalocyanine Suspended Gate Field Effect Transistors for NO2 Detection (May 24, 2006), pp. 249-254.

Ranasinghe, Mahinda I. et al., Femtosecond Excitation Energy Transport in Triarylamine Dendrimers (Jan. 2, 2002), pp. 6520-6521.

Rao, Yang et al., Novel Polymer-Ceramic Nanocomposite Based on High Dielectric Constant Epoxy Formula for Embedded Capacitor Application (Feb. 4, 2001), pp. 1084-1090.

Tummala, Rao R. et al., The SOP for Miniaturized, Mixed-Signal Computing, Communication, and Consumer Systems of the Next Decade (May 2004), pp. 250-267.

Uemura, Takafumi et al., Tunneling-Current-Induced Light Emission from Copper Phthalocyanine Thin Films (Nov. 13, 2005), pp. 559-562.

Wang, Fei et al., An Electrically Conducting Star Polymer (Mar. 20, 1997), pp. 11106-11107.

Wang, Fei et al., Electroactive and Conducting Star-Branched Poly (3-Hexylthiopene)s with a Conjugated Core (Nov. 17, 1998), pp. 4272-4278.

Wang, Jing-Wen et al., High Dielectric Constant Composite of P(VDF-TrFE) with Grafted Copper Phthalocyanine Oligomer (Feb. 13, 2004), Title Page, pp. 2294-2298.

Wang, Jing-Wen et al., Microstructure and Dielectric Properties of P(VDF-TrFE-CFE) with Partially Grafted Copper Phthalocyanine Oligomer (Feb. 12, 2005), Title Page, pp. 2247-2252.

Wang, Ying et al., Ultrafast Dynamics in Multibranched Structures with Enhanced Two-Photon Absorption (Feb. 21, 2005), pp. 10128-10129.

Xie, W.F. et al., High-Contrast and High-Efficiency Top-Emitting Organic Light-Emitting Devices (2006), pp. 95-97.

Xu, Haisheng et al., High Dielectric Constant Composites Based On Metallophthalocyanine Oligomer and Poly(vinylidene fluoride-trifluorethylene) Copolymer (Oct. 10, 2000), pp. 70-75.

Yakimov A. et al., High Photovoltage Multiple-Heterojunction Organic Solar Cells Incorporating Interfacial Metallic Nonoclusters (Nov. 19, 2001), pp. 1667-1669.

Yan, X.Z. et al., Polaron Delocalization in Ladder Macromolecular Systems (Jan. 31, 2005), Title Page, pp. 9105-9116.

Yan, Xingzhong et al., Up-Converted Emission in a Series of Phenylazomethine Dendrimers with a Porphyrin Core (Dec. 27, 2004), pp. 9321-9329.

\* cited by examiner

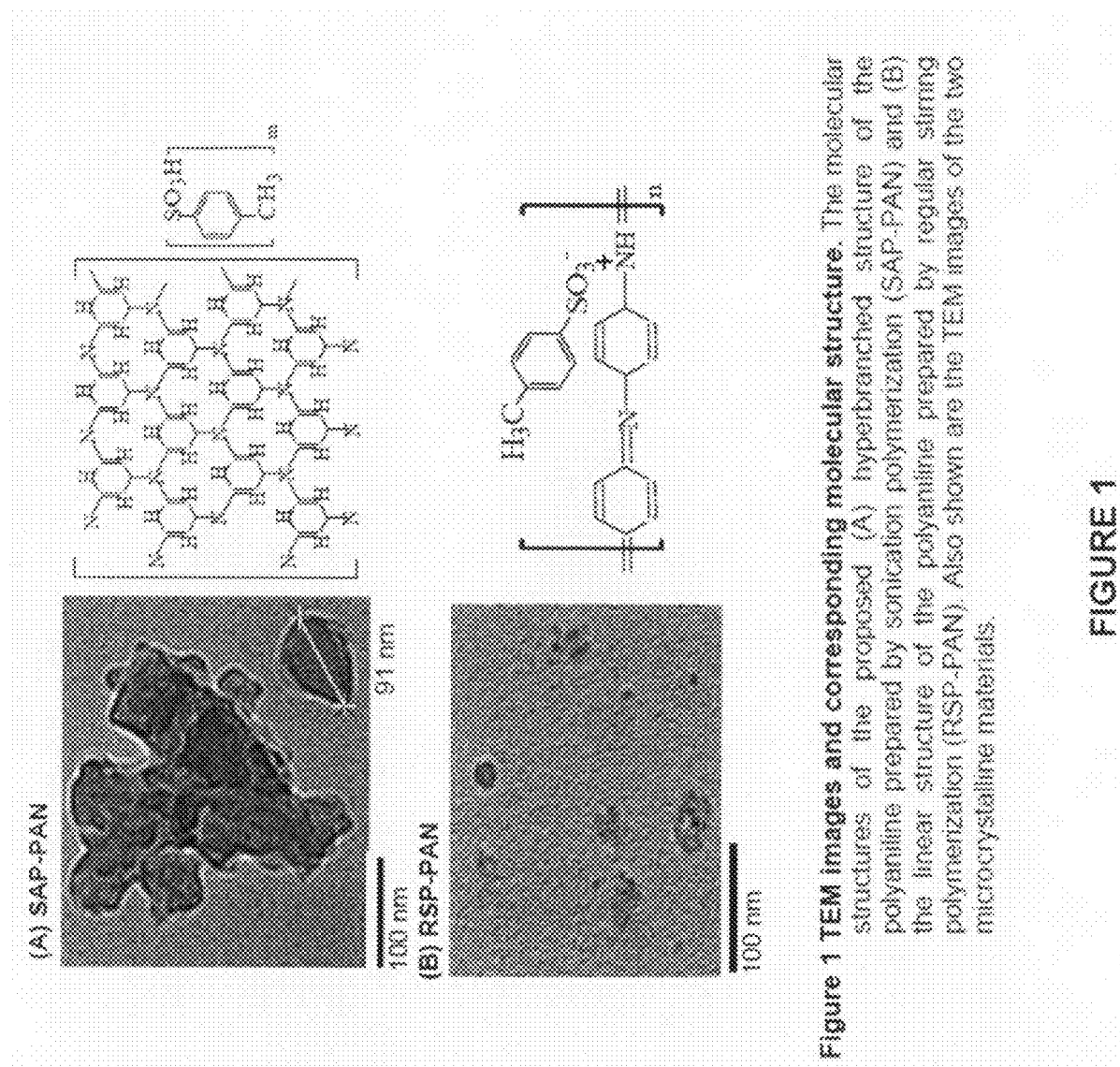

Figure 1 TEM images and corresponding molecular structure. The molecular structures of the proposed (A) hyperbranched structure of the polyaniline prepared by sonication polymerization (SAP-PAN) and (B) the linear structure of the polyaniline prepared by regular stirring polymerization (RSP-PAN). Also shown are the TEM images of the two microcrystalline materials.

FIGURE 1

Figure 2 Dielectric dispersion curves. The frequency dependence of the dielectric constant of (A) Polyaniline pristine discs and (B) 2 wt% polyaniline/ PEMA-co-PMMA films.

Figure 3 Thickness dependence of capacitances of SAP-PAN pellets measured at 1 V polarization level at 1 MHz.

Figure 4 Dielectric loss (A) and AC conductivity (B) of 2 wt% polyaniline/PEMA-co-PMMA films (Dot lines are the fitting curves of the power law).

Figure 5 $\chi^{spin}$-1/T plots and EPR spectra. Insert. EPR spectra of ~1 mg polyaniline near $g$ ~2.0 at room temperature.

FIGURE 12B Polaron tunneling mechanism

FIGURE 12A Polaron Hopping Mechanism

ORGANIC BRANCHED AND HYPERBRANCHED SYSTEMS FOR HIGH DIELECTRIC AND CAPACITANCE APPLICATIONS

CROSS-REFERENCE TO RELATED APPLICATIONS

This application claims the benefit of U.S. Provisional Application No. 60/946,562, filed on Jun. 27, 2007. The disclosure of the above application is incorporated herein by reference.

GOVERNMENT RIGHTS

This invention was made with government support under Grant No. N00014-05-1-0015 awarded by the Office of Naval Research. The government may have rights in the invention.

FIELD

The present disclosure relates to dielectric materials and more particularly to organic hyperbranched macromolecular structures having high dielectric constants at high frequencies which are suitable for use in high speed capacitor applications.

INTRODUCTION

The statements in this section merely provide background information related to the present disclosure and may not constitute prior art.

There is a need for new high dielectric constant materials for improved embedded capacitor applications involving system-on-package (SOP) technology. The use of SOP is important for high speed secure propagation and increased capacity of printed circuit boards. Further, new materials for SOP technology present a possibility for reducing fabrication costs. Also, developing new materials with high dielectric constants, high break-down voltages, and low dissipation factors, would provide important components of advanced high energy density and pulsed-energy capacitors for both military and civilian device applications. While there is an impressive industry for inorganic capacitors, these materials often suffer from both poor stability and flexibility. In response to these limitations, various dopants for inorganic materials have been explored, such as the process of incorporating ceramic architectures into various polymeric matrices. This processing has improved the percolation threshold limit to some extent. However, there is still a need for highly effective and stable materials which have high dielectric constants, high break-down voltages, and low dissipation factors.

SUMMARY

The present disclosure provides compositions and methods relating to an electrical device that includes two electrodes and an organic dielectric material disposed between the electrodes. The organic dielectric material includes a branched or hyperbranched macromolecule having delocalized electrons. The organic dielectric material may be operable to provide a majority of the dielectric activity between the electrodes, substantially all of the dielectric activity between the electrodes, or all of the dielectric activity between the electrodes.

In some embodiments, the electrical device further comprises at least one additional material mixed with the organic dielectric material. The additional material may be a polymer having substantially no dielectric activity, an inorganic material such as silicon or a silicon compound, a metal or metal compound, and/or an organic liquid medium. In some embodiments, the electrical device includes an organic dielectric material that is operable at a frequency of greater than or equal to about 1 KHz. Electrodes in the electrical device may be plates and the device may be a capacitor.

In some embodiments, the present disclosure provides compositions and methods relating to an energy storage device. The energy storage device includes two electrodes, an organic dielectric material disposed between the two electrodes, and an electric potential between the two electrodes. The organic dielectric material includes a branched or hyperbranched macromolecule having delocalized electrons. The organic dielectric material is operable to provide substantially all of a dielectric activity between the electrodes in the energy storage device.

In some embodiments, the present disclosure provides methods of storing an electrical charge. The method includes establishing an electrical potential across an organic dielectric material disposed between two electrodes. The organic dielectric material includes a branched or hyperbranched macromolecule having delocalized electrons. Substantially all of the dielectric activity between the electrodes may be provided by the organic dielectric material.

Benefits and advantages of the present compositions and methods include the provision or use of a material where the majority, substantially all, or all of the dielectric activity is provided by the organic dielectric material. These organic dielectric materials provide high dielectric constants, capacitance values, and frequencies as compared with conventional dielectric materials.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 shows transmission electron microscopy (TEM) images and corresponding molecular structure of the proposed (A) hyperbranched structure of the polyaniline prepared by sonication polymerization (SAP-PAN) and (B) the linear structure of the polyaniline prepared by regular stirring polymerization (RSP-PAN);

FIGS. 2A and 2B graphically illustrate dielectric dispersion curves and frequency dependence of the dielectric constant of (A) hyperbranched (SAP-PAN) and linear polyaniline (RSP-PAN) pristine discs and (B) 2 wt % hyperbranched (SAP-PAN) and linear polyaniline/PEMA-co-PMMA films;

FIG. 3 graphically illustrates the thickness dependence of capacitances of SAP-PAN pellets measured at 1 V polarization level at 1 MHz;

FIGS. 4A and 4B graphically illustrate the dielectric loss (A) and AC conductivity (B) of 2 wt % polyaniline/PEMA-co-PMMA films (dotted lines are the fitting curves of the power law);

FIG. 5 graphically illustrates the $X^{spin}$-1/T plots and the insert illustrates the EPR spectra of ~1 mg polyaniline near g ~2.0 at room temperature;

Figure 8:
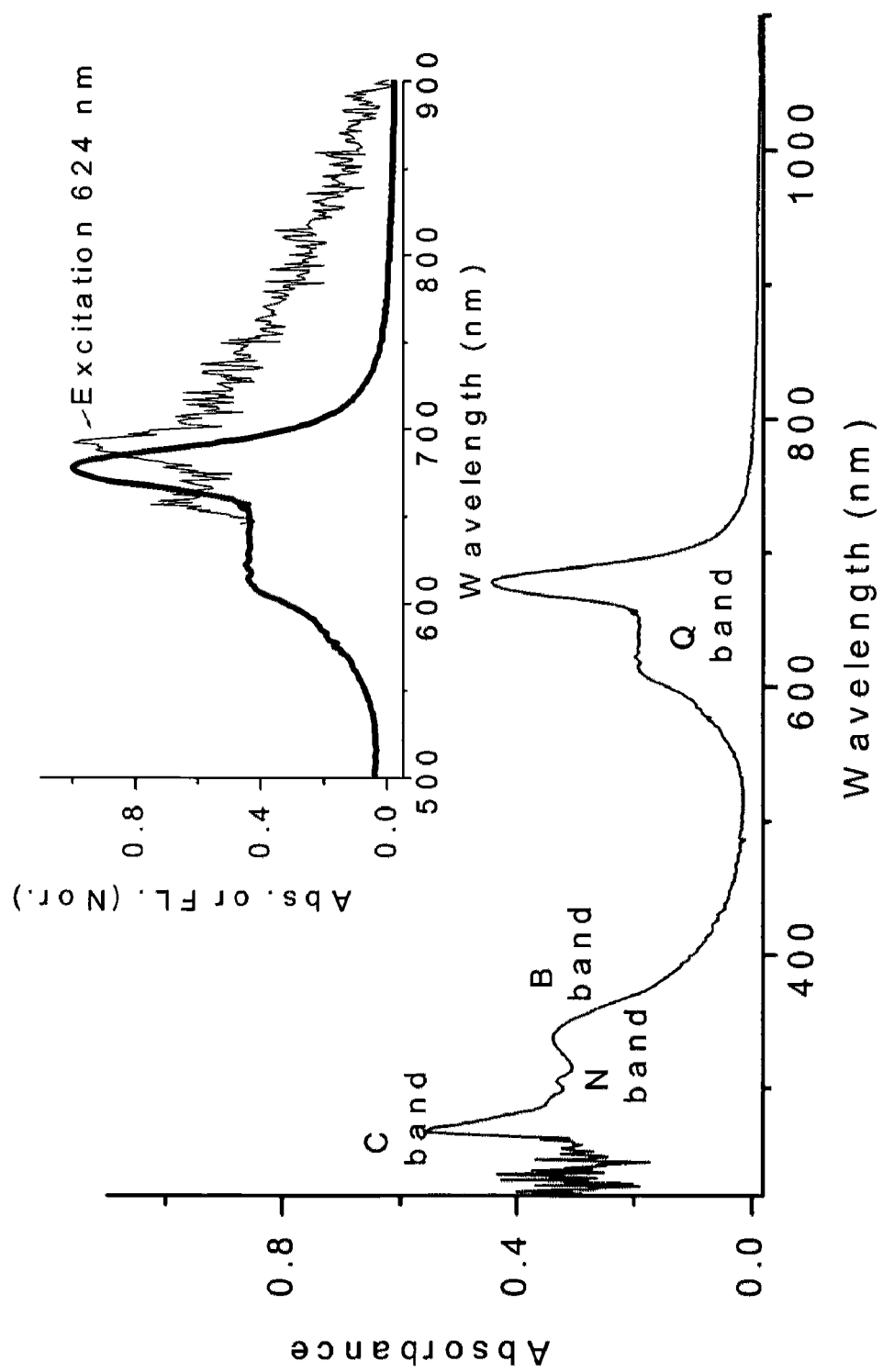
Figure 9:
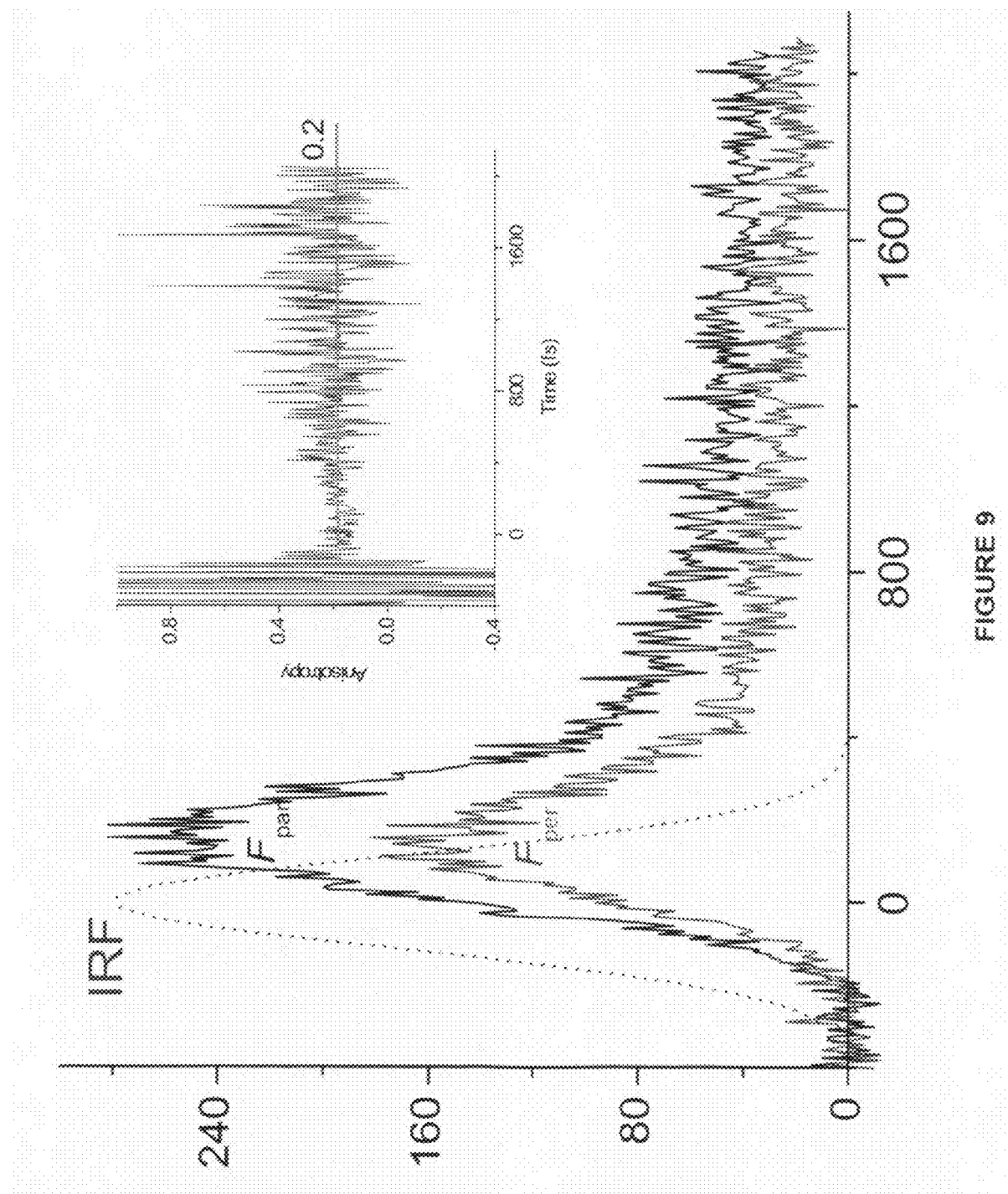
Figure 10:
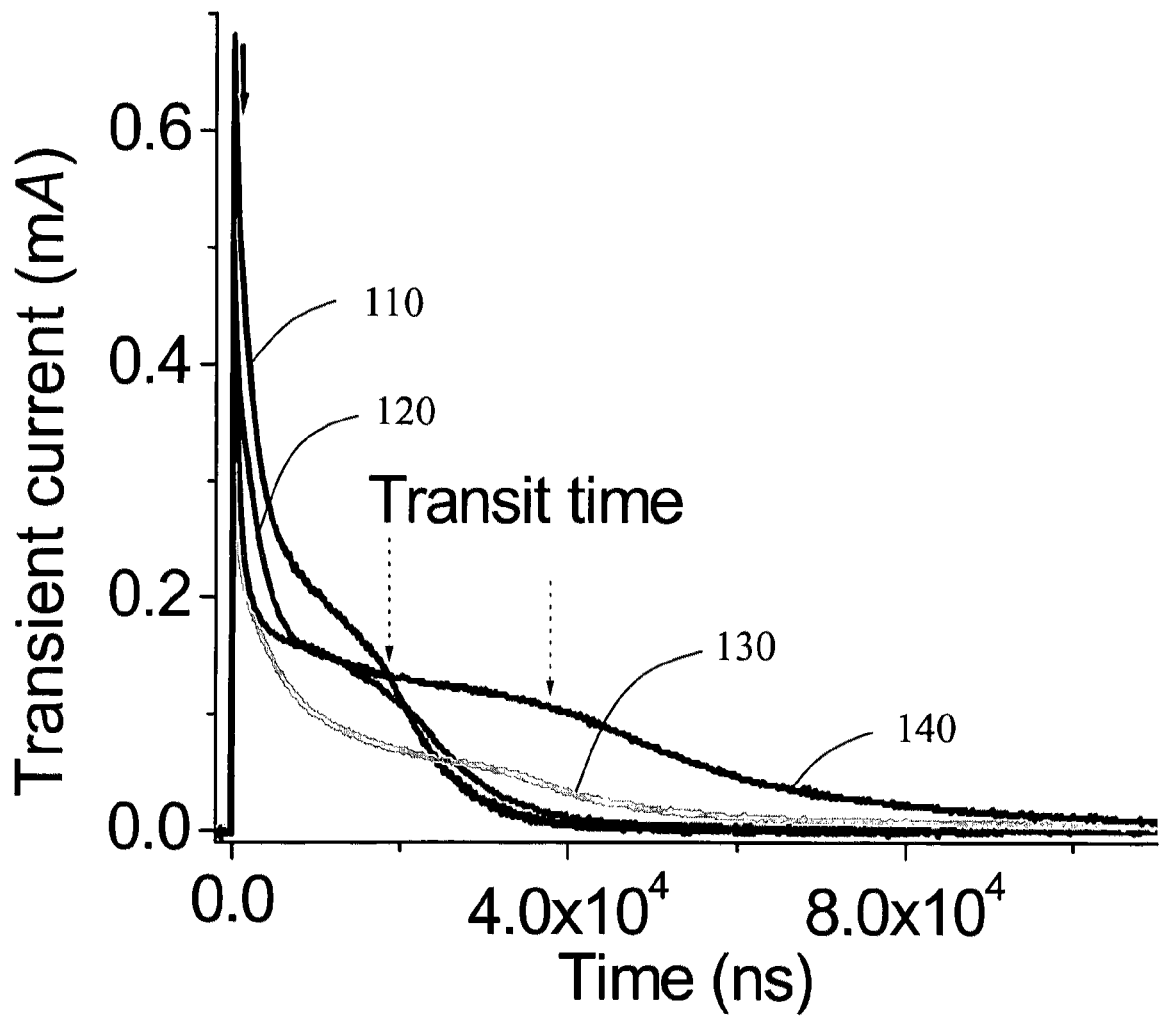
Figure 11:
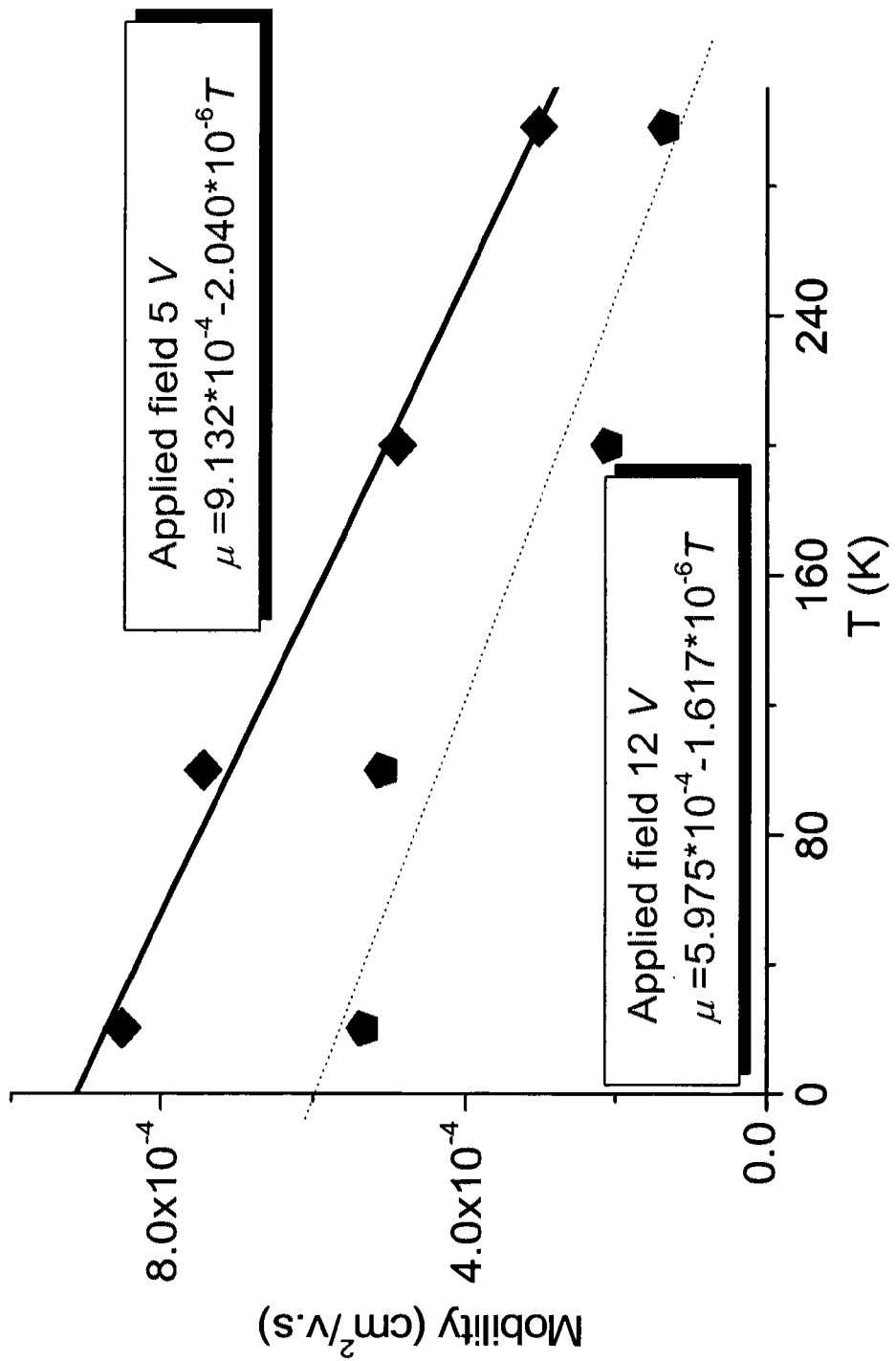
Figure 12:
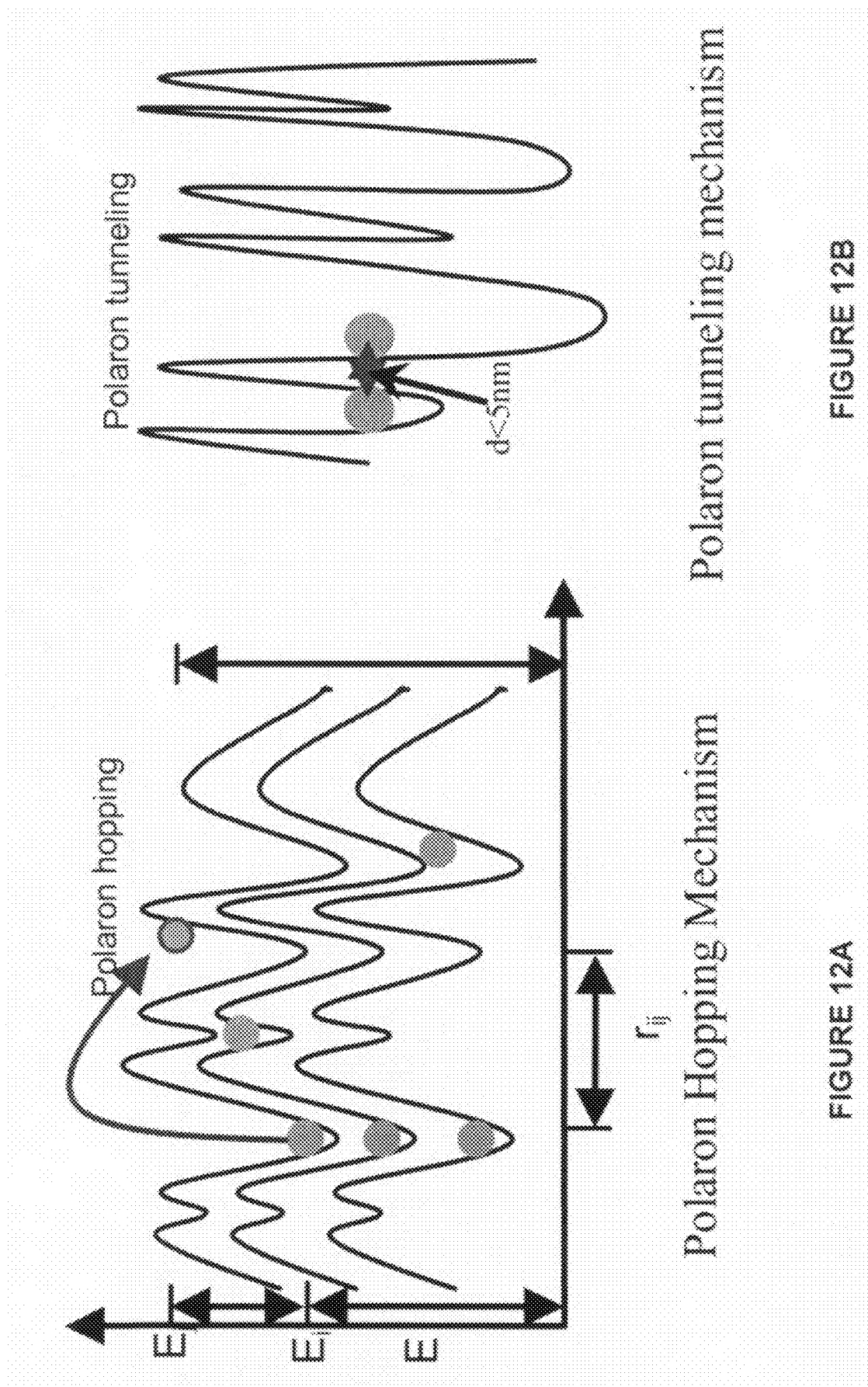
Figure 13:
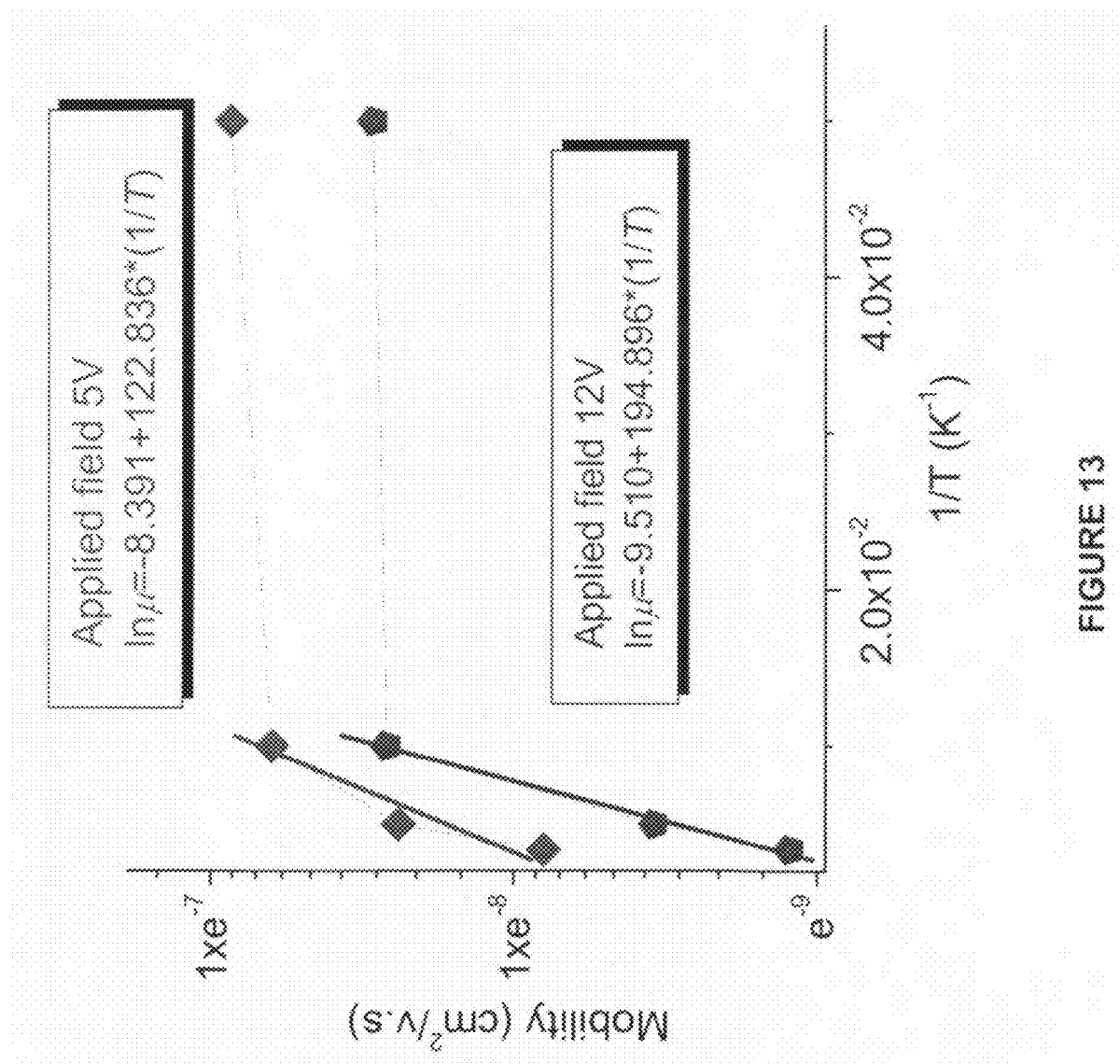
Figure 14:
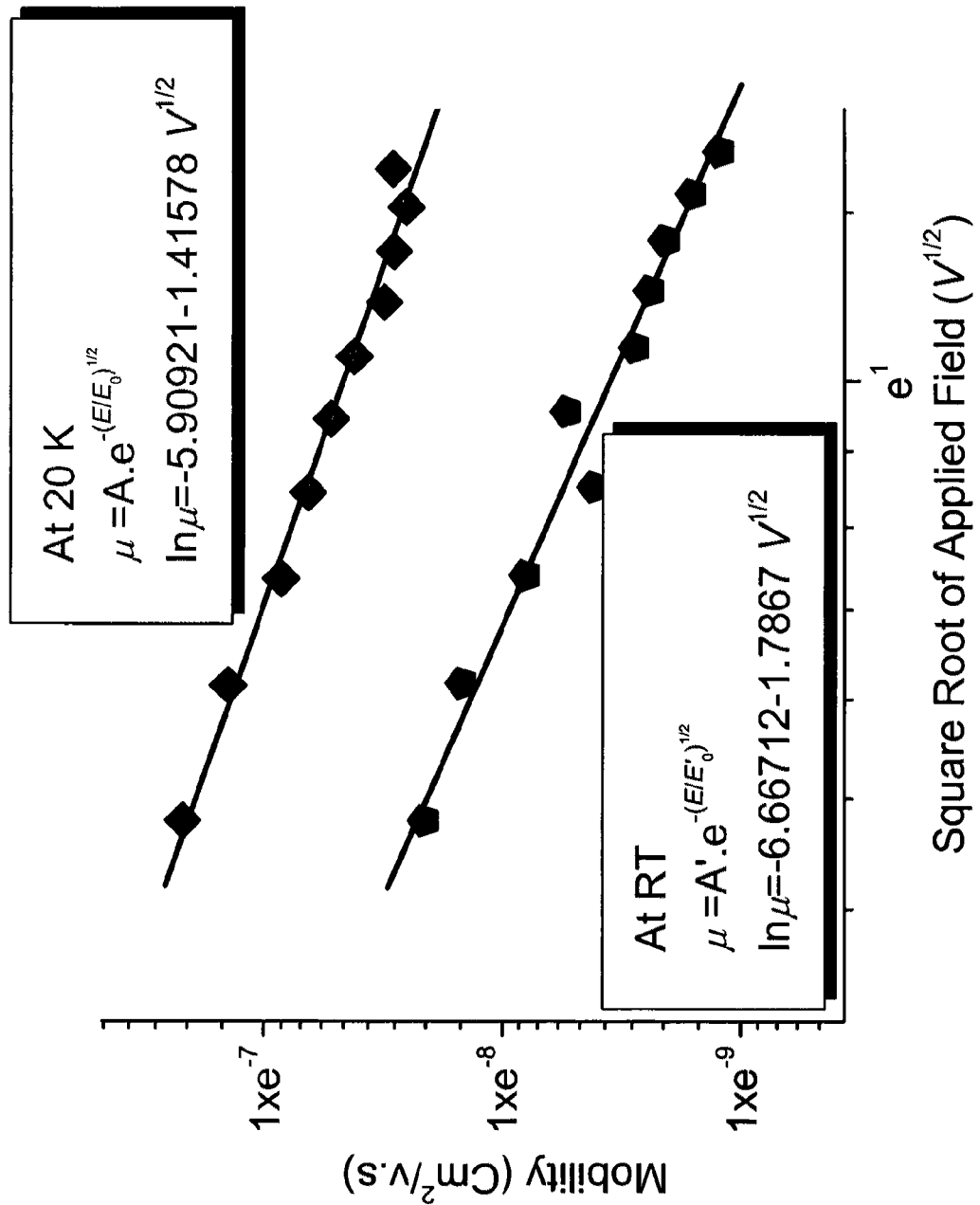

FIG. 8 graphically illustrates absorption and emission (input) spectra of a CuPc dendrimer;

FIG. 9 graphically illustrates the B-band fluorescence dynamics and fluorescence decay (input) of a CuPc dendrimer at an excitation of 400 nm;

FIG. 10 graphically illustrates the transient current of the CuPc dendrimer/Silicon film with an applied electric field of 5V at various temperatures (reference numeral 110 is Black: 20K; reference numeral 120 is Red: 100K; reference numeral 130 is Green: 200K; reference numeral 130 is Blue: room temperature), the sharp peak indicating electron transportation in silicon wafer;

FIG. 11 graphically illustrates the temperature dependence of charge carrier mobility at two different applied electric fields, 5V and 12V, respectively;

FIGS. 12A and 12B illustrate polaron hopping and tunneling models;

FIG. 13 graphically illustrates an Arrhenius plot of the charge carrier mobility at two different applied electric field, 5V and 12V respectively; and FIG. 14 graphically illustrates the charge carrier mobility versus the square root of electric field strength at different temperatures.

DETAILED DESCRIPTION

The disclosure of U.S. Provisional Application No. 60/816,685, filed on Jun. 27, 2006 is incorporated herein by reference in its entirety. In addition, recitation of any reference herein includes express incorporation of the reference in its entirety.

Dielectric materials are important for a variety of optical and electronic applications. The present disclosure provides compositions and methods that include organic dielectric materials that have high dielectric constants, high breakdown voltages, and low dissipation factors. In accordance with the principles set forth in the disclosure, the present organic dielectric materials may delocalize excitations within a macromolecular framework, which is useful for enhanced effects important to light harvesting, nonlinear optical, quantum optical, and electronic applications.

In some embodiments, the present disclosure provides an organic dielectric material comprising a branched and/or hyperbranched macromolecule having delocalized electrons. Hyperbranched macromolecules represent a class of macromolecules having additional features compared to linear and crosslinked linear polymers. Hyperbranched macromolecules are characterized by a large number of chain ends terminating from branching units that may emanate from a core structure. Synthesis of hyperbranched macromolecules may include reaction of the core with a branching unit followed by subsequent reaction of the terminal sites of the branching units, optionally to derivatize the terminal sites or to add additional branching functionality. Cores may range from those having a single branching site (i.e., monovalent) to multiple branching sites (i.e., polyvalent), or where the core itself is a branched macromolecule that is extended by another generation of branching units.

Batch and step-wise synthetic routes may be used to produce hyperbranched macromolecules. However, step-wise routes may be performed by an iterative process to synthesize successive branching generations, using the same or different branching units in each generation. These methods may be used generate different degrees of random or ordered hyperbranched macromolecules. In some cases, hyperbranched macromolecules may be synthesized where intramolecular crosslinking is greatly reduced or prevented; assuring continued and ordered branching of the polymer.

Divergent synthesis of hyperbranched macromolecules from a monovalent core can be used to produce hyperbranched macromolecules, while use of a polyvalent core can produce multiple hyperbranched macromolecule portions radiating from a common core, which is also known as a dendritic polymer or dendrimer. Other terms used to describe various dendritic polymers include arborol, cascade, cauliflower, and star polymers. In some cases, hyperbranched macromolecules may form dendritic segments. These multiple hyperbranched macromolecules, or dendritic segments, may be coupled to a common core in order to convergently form a dendrimer.

As used herein, a hyperbranched macromolecule includes random hyperbranched macromolecules as well as hyperbranched macromolecules with controlled branching. Random branching can be produced using one-pot or batch reaction of multifunctional branched compounds, and in some cases, may also result in intramolecular crosslinking. Controlled branching can occur where multifunctional compounds are used in sequential multi-step or iterative syntheses to impart particular directionality in the resulting product. Controlled branching can also prevent or substantially limit intramolecular crosslinking. In some cases, a hyperbranched macromolecule may be a dendritic segment, where the origin of one or more branching generations may be subsequently joined to a dendrimer core. As a result, a hyperbranched macromolecule may be part of a larger dendrimer, or multiple dendritic segments may be joined to a single core in order to form a dendrimer. Thus, instances of the hyperbranched macromolecule should be understood to also embody part of a dendrimer, where possible.

Dendrimers can be synthesized by two approaches: a convergent method where growth begins at the chain ends (i.e., termini) and proceeds inward with the final reaction being attachment of several dendritic segments to a central polyfunctional core molecule; and a divergent method where growth begins with a central core and proceeds outward with an ever increasing number of branching reactions required for generation growth. The hyperbranched macromolecules described herein may be formed by or used in these two approaches.

The present organic dielectric materials comprising a branched and/or hyperbranched macromolecule have delocalized electrons. Delocalized electrons, for example, include those found in conjugated systems of double bonds, such as those found in aromatic compounds and polymers and macromolecules of such compounds. These materials exhibit high dielectric constants and good charge separation in capacitors and other electrical devices. Examples of organic dielectric materials having delocalized electrons include branched and hyperbranched macromolecules of polyaniline, phthalocyanine, porphyrin, thiophene, mixtures thereof, and co-polymers of such suitable polymers. Additional examples include branched and hyperbranched macromolecules of polyacetylene, polypyrrole, polythiophene, polyfluorene, poly(3-alkylthiophene), polytetrathiafulvalenes, polynaphthalenes, poly(p-phenylene sulfide), poly(para-phenylene vinylene), mixtures thereof, and mixed copolymers thereof.

The organic dielectric material may also include a dopant. Dopants are well-known to those of skill in the art and are typically polar and/or highly polar materials, acid-like structured compounds, metals, and/or chromophores, electrolytes, polyaniline, sulfonic acid, barium titanate, inorganic salts, dipolar organic molecules, salts of organic acids, among others.

The organic dielectric material may include one or more micro-crystalline domains. Crystallinity of the material may change based on the temperature and the propensity for self-organization of domains within the material.

In some embodiments, the present disclosure provides an electrical device comprising at least two electrodes and an organic dielectric material. The organic dielectric material may be a branched and/or hyperbranched macromolecule having delocalized electrons. At least a portion of the organic dielectric material may be disposed between the two electrodes. One electrode may have an opposite charge from the other electrode. An electric potential may exist between the two electrodes. The organic dielectric material comprising a branched and/or hyperbranched macromolecule may have very high energy density, storage, and transfer. Such materials may exhibit a strong and fast dielectric response.

In some embodiments, the electrical device is a capacitor. Capacitors, in general and in specific applications, are well known in the art. Various types of capacitors, e.g., electrolytic, paper, metallized, and polymer-based capacitors, are known in many forms in the art. The general structure of a capacitor includes a dielectric material layered between two conductive electrodes, such as metal plates. An electrical charge proportional to the voltage may be stored in the capacitor when a voltage is applied across the electrodes. Electrodes are also known in the art as "electrode plates," "electrode surfaces," or "opposing plates" or the like. The electrodes are typically electrically connected to other components of an electrical device.

The capacitance (C) of a parallel-plate capacitor is given by the equation: $C=E_0K_dA/d$, where "A" represents the area of the two plates in the capacitor, "$E_0$" represents the dielectric permittivity of vacuum or free space ($8.85 \times 10^{-12}$ F/m), "$K_d$" represents the dielectric constant of the dielectric, and "d" is the distance between the two plates of the capacitor. As can be seen, capacitance depends upon the thickness of the dielectric (e.g., the distance between the electrodes), the dielectric constant of the dielectric, and the area (or effective area) of contact between the plates of the capacitor. Thus, greater capacitance can be achieved by, e.g., increasing the dielectric constant of the dielectric (e.g., by choosing a particular dielectric material), increasing the electrode surface areas (e.g., by making the electrode plates larger, etc.), decreasing the distance between the electrodes, or combinations thereof. As is evident from the equation, the choice of dielectric material, dimensions of the material, and dimensions of the electrodes are effective means of manipulating the capacitance of capacitors. For example, the present compositions and methods may tailor the composition and dimensions of the organic dielectric material comprising a branched or hyperbranched macromolecule having delocalized electrons with respect to the dimensions of the electrodes to modify the capacitance as desired.

The present organic dielectric materials demonstrate very good capacitor properties at high frequencies with low loss. The organic dielectric materials exhibit high breakdown voltages that enable their use in a robust and rugged electrical device, such as a capacitor. Further, such organic dielectric materials may be processed in high volumes at low costs, for use in commercial and practicable manufacturing applications. In this regard, the dielectric materials may be used for high energy storage and in various electrical devices where a large amount of electrical energy is stored and released in short time periods, such as pulsed lasers and other high frequency discharge systems. Thus, the organic dielectric materials of the present disclosure are very versatile and enhance performance parameters of capacitors and other electrical devices by several orders of magnitude over various known conventional systems, while considerably reducing losses, and achieving significantly larger capacitance and dielectric values.

In some embodiments, the present disclosure provides methods of making a dielectric material. The method may include polymerizing a monomer by sonication polymerization to form a branched or hyperbranched macromolecule. In some embodiments, the monomer comprises aniline. As described, the polymerizing may form branched and hyperbranched macromolecules of phthalocyanine, porphyrin, thiophene, and mixtures and co-polymers of such polymers and other suitable polymers.

In some embodiments, the organic dielectric materials are hyper-branched and/or monodisperse-branched structures that have delocalized electrons. Such structures have delocalized polarization (dielectric) effects at relatively high frequencies (> about 1 KHz). In various aspects, the electronic and optical properties of exemplary branched organic dielectric materials having delocalized electrons are described in the present disclosure. However, the disclosure is not limited to such embodiments of the described polymer systems, which merely exemplify suitable materials and systems, as appreciated by a skilled artisan.

The present organic dielectric materials have beneficial advantages when assessed for capacitance, steady state adsorption and emission, time-of-flight, ultra-fast time-resolved fluorescence, and EPR spectroscopy. In certain aspects, the organic materials having branched macromolecular architecture have new and useful properties compared to traditional linear polymer analogs, which provide for enhancements in optical and electronic applications. While not limiting the present disclosure to any particular theory, it appears that certain organic dielectric materials in accordance with the disclosure exhibit a new mechanism involving macroscopic polarization, which may be involved when organic materials are used for high dielectric constant applications. The theories and mechanisms provided in the disclosure are not intended to limit the disclosure in any particular way.

The present disclosure includes compositions and methods that provide and use organic dielectric materials having branched and/or hyperbranched structures that demonstrate enhanced electronic (polarization) effects. The present disclosure further illustrates and characterizes the structure-function relationships that contribute to creating high frequency all-organic capacitors with these organic dielectric materials. For example, hyperbranched polyaniline (PAN) polymer-based materials have particular advantages as compared to PAN materials having linear structures. While not limiting to any particular theory, branched and/or hyperbranched structures in organic materials may relate to the dynamics of polarons within the material, as well as a hyper-electronic polarization in these structures. In various aspects, an organic dielectric material including a branched and/or hyperbranched macromolecule having a high dielectric constant is prepared by a sonication polymerization (SAP) method. For comparative purposes, a linear PAN material is prepared by a regular stirring polymerization (RSP) method.

Figure 6:
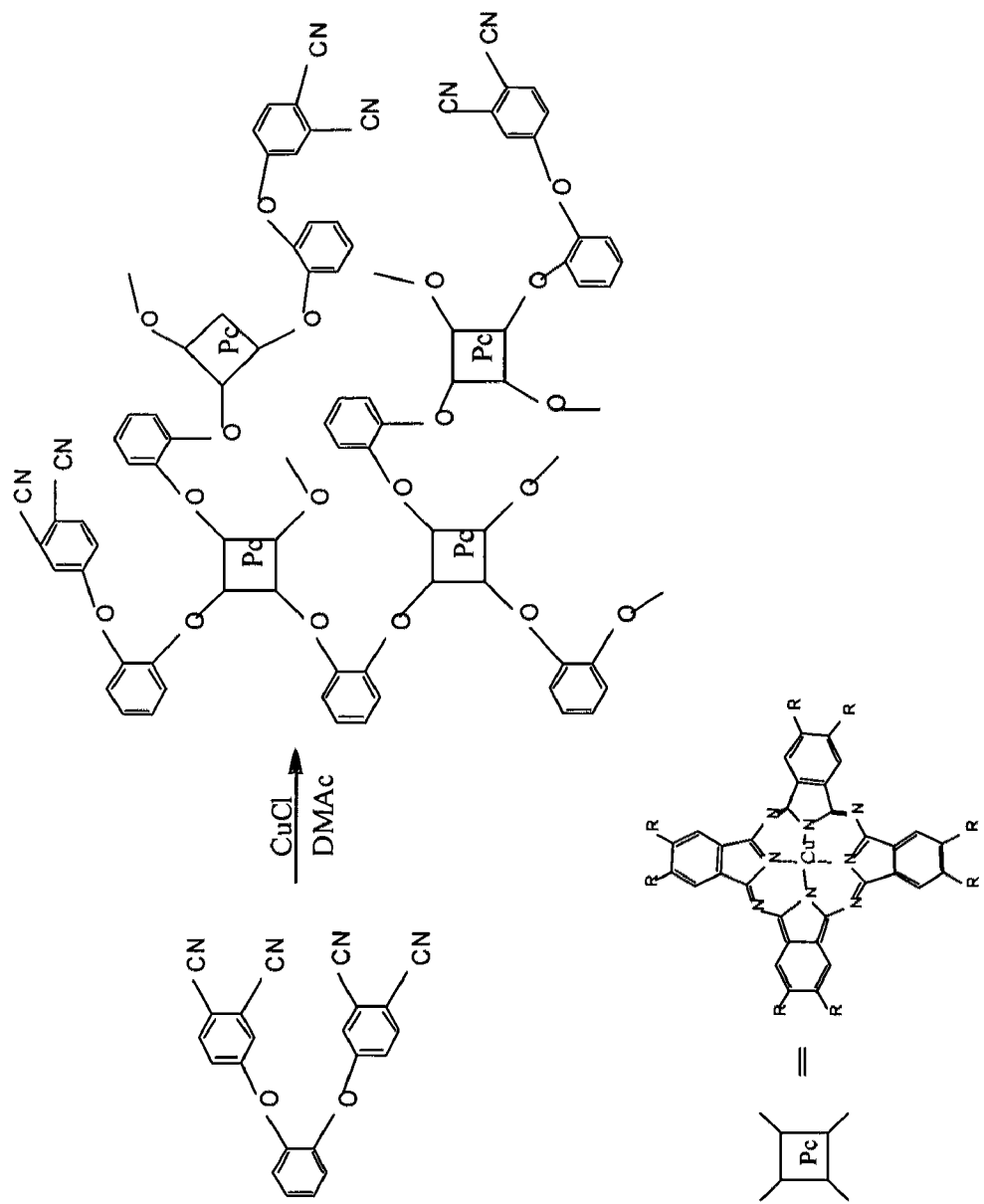
FIG. 6 illustrates the structure of hyper-branched phthalocyanine (Pc) dendrimer.

As shown in FIG. 1, different methods of preparation result in different micro-crystalline morphologies of the PAN solid-state materials. FIG. 6 shows a hyper-branched phthalocyanine (Pc) dendrimer; which may be associated with copper (CuPc). While not limiting to any particular theory by which the present disclosure operates, it is believed that a difference in crystalline morphology plays a major role in the magnitude of the dielectric response at higher frequencies. It is believed that increased dielectric response for the micro-crystalline domains is due to a delocalized electronic polarization. Electron paramagnetic resonance (EPR) spectroscopy measurements may be used to further assess potential mechanisms of the dielectric response. As set forth herein, each respective discussion of a potential theory or mechanism by which the present teachings operate is non-limiting.

For comparison, hyperbranched and linear polyaniline polymers are prepared by SAP and RSP techniques, respectively. Detailed characterization of and methods of making these two polyanilines is reported in Liu et al., *Macromolecules*, 35 pp. 9414-9 (2002), which is herein incorporated by reference in its entirety. The discs are made by a hydraulic presser with a pressure of 1000 psi using powders. The thickness of these discs is about 1 mm, and the diameter of these discs is about 10 mm. The PAN-doped poly(ethyl methacrylate-co-methyl methacrylate) (PEMA-co-PMMA) (purchased from Aldrich, St. Louis, Mo.) films are prepared by directly mixing the powder to 5 mL of the polymer $CH_2Cl_2$ solutions. The mixed systems are stirred for 8 hours, sonicated for 10 min, and then dried at room temperature. After the evaporation of the solvents, the films are dried at 50° C. for another 3 hours in a vacuum. Typical film thicknesses of these composite films ranges from about 80 to 120 μm.

TEM images are acquired in the bright field mode on a JEOL (Peabody, Mass.) 2010EX microscope. 1 mg PAN is dispersed in 5 mL of ethanol and cast on a holey copper grid using one drop of the solution where ethanol is subsequently evaporated.

Dielectric measurements are carried out by a 4284A HP LCR meter with an HP 16451B feature. A contacting electrode method is used. The diameter (d) of the guarded electrode is 5 mm. The capacitance ($C_p$) and dissipation factor of the PAN samples are recorded. The dielectric constant $\in_r$ is calculated by $\in_r = L*C_p/[\pi(d/2)^2\in_0]$. Here, L is the thickness of the film and $\in_0$, the permittivity of the free space, is $8.854*10^{-12}$ F/m. The experimental conditions for the measurements are kept constant for both polyaniline samples. Stable polarization fields are found to be built for both systems under the same experimental conditions. The effect from the humidity and the moisture, as well as the interface effect in the experiments, is controlled by the observation of the relationship between the capacitance and the thickness of the sample. No effect from any "double-layer" capacitors originating from the effect of the humidity is observed.

EPR spectra are recorded on a Bruker EMX spectrometer operating in the X-band (~9.43 GHz) equipped with a $N_2$ temperature controller, and an ER041XG microwave bridge with a frequency count function. Samples are sealed in 1 mm capillary tubes under argon atmosphere. The g values are estimated based on the peak positions of the third line of $Mn^{+2}$/CaO marker (g~2.034) and are also correct based on the g value of DPPH solid (g~2.0036). Spin concentrations are estimated based on the intensity of the third line of the $Mn^{+2}$/CaO marker calibrated against TMPO in water solutions with known concentrations ($1*10^{-3}$ to about $~1*10^{-4}$ M). For quantitative EPR determinations over a temperature range, there is preferably no microwave saturation of the sample and further, the system is at thermal equilibrium. No saturation is observed for the polyanilines at 0.6 mW in the range from 135 to 295 K. In a series of variable temperature experiments, a thermal equilibrium can be reached after the samples are kept at each temperature setting for about 20 minutes. The effect of Q value on the EPR signal is corrected. The Q value varies in a range of about 3000 to about 3300 during the temperature variation at a microwave power of 0.6 mW. Proper conditions, including data resolution of the spectra, sweep time and modulation amplitude, are ascertained for all EPR measurements.

Structural features and the preparation of samples include the following details. The development of new structure/function relationships in connection with the improvement of the dielectric response at a high frequency is desirable. Toward this aim, two different PAN materials (SAP-PAN and RSP-PAN) are prepared according to reported methods and as described. The SAP-PAN material possesses large crystalline sizes and a hyperbranched structure, based upon detailed chemical and structural characterization. As shown in FIG. 1, a larger crystalline domain of the SAP-PAN is obtained in comparison to RSP-PAN. The size of the domains for the SAP-PAN is about 90 nm, while that for the RSP-PAN is about 10 nm.

While not limiting to any particular mechanism, the following discussion relates to advantages of the doped SAP-PAN structure and reasons why such materials appear to have superior advantages as a dielectric material. It is believed that the SAP-PAN hyperbranched structure gives rise to a macromolecular architecture which contains a number of locations at which "holes" are trapped. There are several advantages of a branched and/or hyperbranched system in an organic material for the purpose of generating a high dielectric constant material. First, a hyperbranched conjugated structure appears to provide a significantly larger polaron delocalization length in three dimensions. A larger isotropic polaron delocalization length may increase the dielectric constant and avoid anisotropy of the dielectric response. Second, a hyperbranched conjugated structure appears to support an ultra-fast polaron delocalization through intra-molecular charge transfer. Such an ultra-fast polaron delocalization may bring about a fast dielectric response, which is needed for high frequency applications. Third, a hyperbranched structure may facilitate the construction of a well-packed system via use of supra-molecular chemistry. Such structures can increase both the strength and the stability of the dielectric response.

For comparison, the linear polyaniline RSP-PAN (FIG. 1) is also investigated. These two structures are investigated as pristine discs, as well as dopants (fillers) in an inert polymeric host, poly(ethylmethacrylate-co-methylmethacrylate) (PEMA-co-PMMA). Thus, in some aspects, the polyaniline is a dopant in an inert polymeric host.

Dielectric properties of the organic materials are characterized as follows. For comparison of dielectric properties of the two forms of polyaniline (hyperbranched and linear), the frequency dependence of the real part of the dielectric constant ($\in_r$) is measured. A variation is observed in the maximum dielectric response and in the dispersion of the dielectric constant for both PAN samples. The polyaniline base (PAN-base, without dopant) itself gave an expected small dielectric response at all of the frequencies investigated. However, the p-toluenesulfonic acid doped hyperbranched and linear PAN materials have significantly different behavior. For example, the linear PAN material RSP-PAN shows a lower dielectric response both in the low and high frequency ranges as compared to SAP-PAN. A very high dielectric response ($\in_r > 10^4$) at low frequencies may also suggest that there is a hyper-electronic polarization and a strong polaron delocalization in the SAP-PAN system. A larger $\in_r$ value (frequency→0) of the SAP-PAN may be explained by the larger polaron localization length in the SAP-PAN system in comparison to the RSP-PAN system.

Figures 2A, 2B:
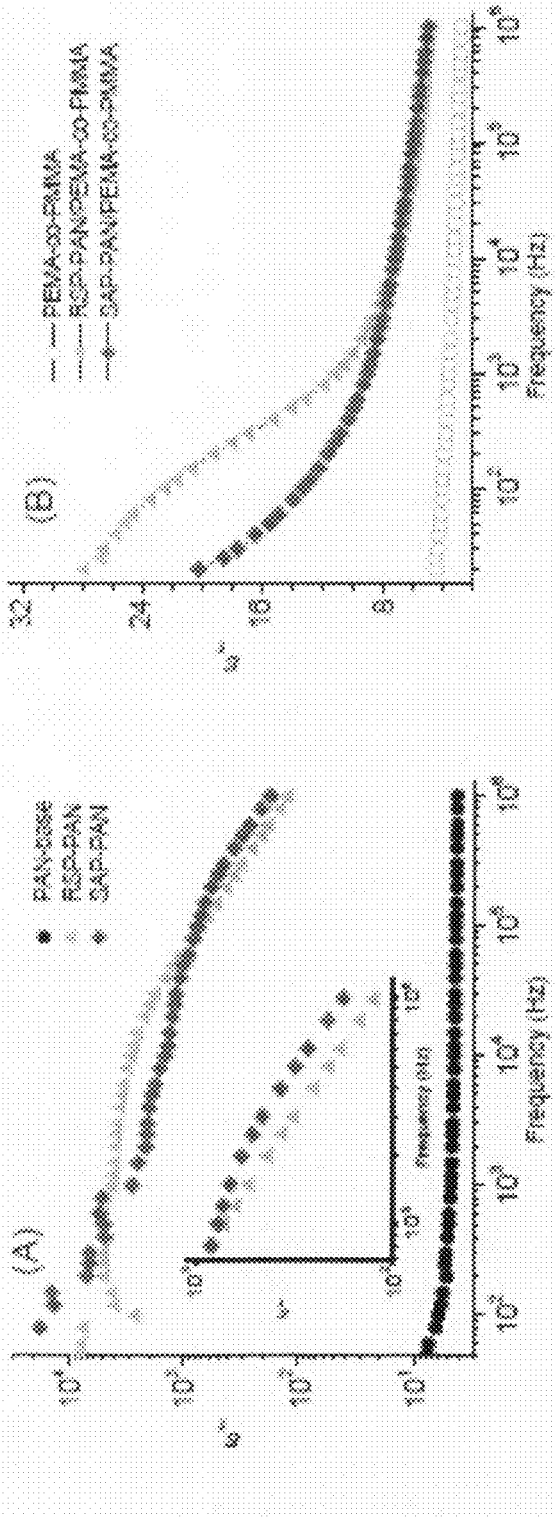
Figure 3:
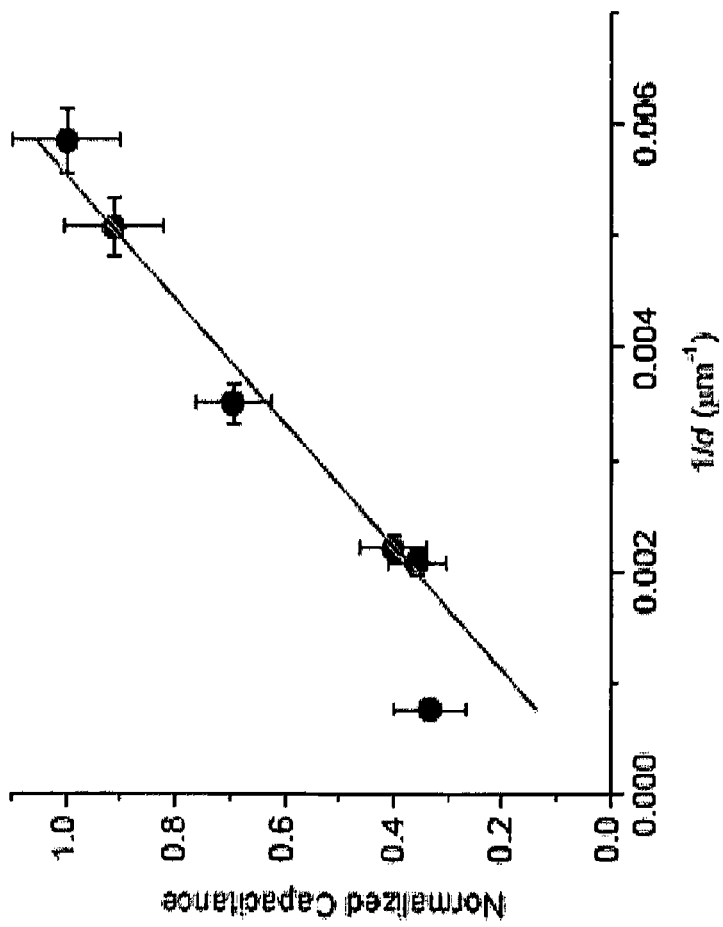

It is highly desirable to obtain a high dielectric response at higher frequencies, and FIG. 2 shows that the SAP-PAN system has a desirably large dielectric response at much higher frequencies (>100 KHz). It appears that the capacitance is roughly proportional to the inverse of the thicknesses of the samples at several frequencies, for example at 1 MHz (FIG. 3). Also, similar shapes of dielectric spectra are found for all samples for the hyperbranched structure with different thicknesses. This suggests that there is very little effect from any "double-layer" capacitors originating from the effect of the humidity and interface property. While not limiting to any particular theory, this suggests that the capacitance is related to a bulk electronic property. The two PAN materials (hyperbranched and linear) have different dispersions. SAP-PAN appears to have a dispersion that favors a higher response at higher operational frequencies. Linear doped PAN samples, such as RSP-PAN, have large permittivity values at much lower frequencies and small $\in_r$ values at high frequencies. In contrast, the hyperbranched SAP-PAN sample still possesses a relatively large dielectric response at high frequencies (about 800 at 100 KHz and about 200 at 1 MHz) in comparison to RSP-PAN and other organic materials. It is theorized that this behavior may originate from a fast polaron delocalization process and a hyper-electronic polarization in the hyperbranched SAP-PAN system. In this regard, organic dielectric materials comprising a branched and/or hyperbranched macromolecule having delocalized electrons of are desirable materials for large capacitance and pulsed capacitor applications, with the SAP-PAN micro-crystalline organic materials providing a suitable working example.

Various mechanisms may explain a large dielectric response in organic materials. These include the polarization mechanisms of ion, space charge and electron displacement, as well as dipole orientation. However, in bulk materials it is not straight-forward to distinguish between ionic and purely electronic polarization. Thus, polymeric guest/host systems with a low ion concentration may provide more information in this regard.

The dielectric loss of the prepared polyaniline samples is also investigated characterized as follows. For both the micro and nano-crystalline materials there is a very large value of the loss at lower frequencies (<10 KHz). This value falls abruptly to about 2 near 1 MHz. There is little difference in the loss between these two systems in this range. The AC conductivity (σ) of these materials depends on their structures and the n-doping states. Here, the imaginary part ($\in'$) of the dielectric function and the angular frequency (ω) are related through an expression given as: $\sigma = \in_o \in_r \omega = \in_o (d\in_r)\omega$. RSP-PAN may have a relatively high doping level and subsequently, a higher conductivity. As expected, this effect is generally connected with the ionic polarization mechanism (including the dipole orientation of ion pairs) at relatively low frequencies. RSP-PAN shows a higher dielectric constant and a higher AC conductivity at a low frequency (1 KHz). This is consistent with the observation of a higher AC conductivity of RSP-PAN compared to the hyperbranched system (SAP-PAN). The SAP-PAN has a relatively higher sustainable field (about 100 V/cm at 100 Hz). The value of the sustainable field for the linear system is only about 60 V/cm. Thus, the hyperbranched SAP-PAN system has less current leakage.

Figures 4A, 4B:
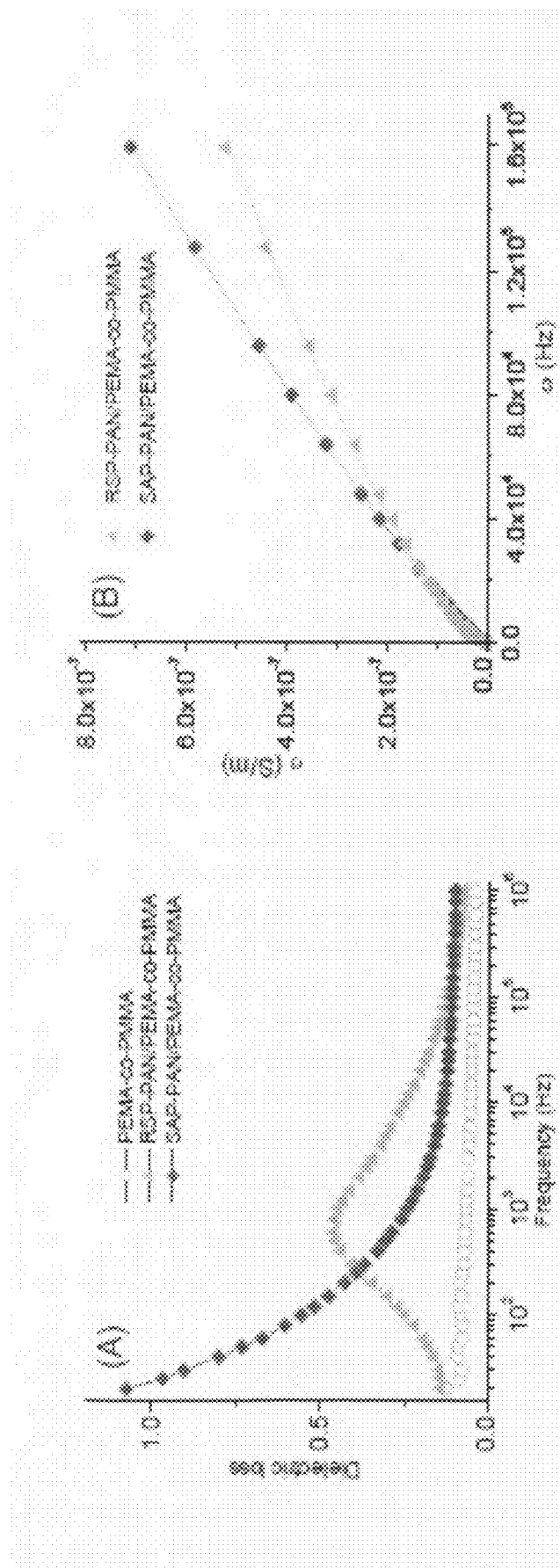

In order to distinguish between the contributions of electronic polarization and ionic polarization, the dielectric response of the prepared PAN samples is also investigated in a low loading guest/host composite configuration. For example, in a low loading regime (2 wt %) PEMA-co-PMMA films (FIG. 2B), SAP-PAN/PEMA-co-PMMA film showed a dielectric constant >8 and a low dielectric loss of <0.2 at a frequency greater than 10 KHz. The dielectric loss of the hyperbranched system doped polymer film increased at low frequencies (FIG. 4A). This SAP-PAN material behavior differs from that of the RSP-PAN/PEMA-co-PMMA film, which demonstrated a loss peak in the range 100-10 KHz. In various aspects, the dielectric materials have a dielectric response of optionally greater than or equal to about 8, optionally greater than or equal to about 10, optionally greater than or equal to about 12, in some cases optionally greater than or equal to about 15, in the presence of a polarization level of 1 V having a frequency of 1 MHz with a dielectric loss less than or equal to about 0.01.

The time scale of this relaxation is estimated to be 0.2 ms (FIG. 4A). The difference in peak position for the two loss measurements appears to originate from the cumulative dipole moment of the main chain of the linear PAN. While not limiting the disclosure to any particular theory, this observation may suggest that charges being displaced "inside" the polymer create a strong localization at a low concentration. However, this peak does not appear on the dielectric spectrum of the hyperbranched SAP-PAN composite in this frequency regime with the same loading level (FIG. 4A). There is only a small shoulder in the higher frequency range of the spectrum for a higher loading level of SAP-PAN/PEMA-co-PMMA. While not limiting, it is believed that this is due to long range delocalization of polarons (carriers) in the SAP-PAN system. It is further believed that the dielectric behavior observed here may be due to the branched structure of SAP-PAN which provides a longer intramolecular charge delocalization length. A large micro-crystalline size of the crystalline domain in the SAP-PAN supports the idea of a large intra-grain delocalization of polarons (carriers).

For estimation of the mechanism of the degree of conductivity in the prepared PAN composites, the conductivities are modeled by the power law given as: $\sigma = A\omega^n$ (FIG. 4B). From the modeling it is found that the index (n) is 0.71 for the nano-crystalline RSP-PAN, and 0.87 for the hyperbranched SAP-PAN. Both of these values are consistent with common amorphous semiconductor index values. While not limiting to any particular mechanism, it appears that the conductivity mechanism is described by a hopping (through-space) process. However, for the case of the hyperbranched SAP-PAN the considerably longer localization length may also follow a more strongly coupled conductivity mechanism via delocalized states. The effects from the dopant species, i.e., the counter-ions of the polarons, are suppressed to the conductivities in the low loading composite films. In certain aspects, the higher dielectric constant and AC conductivity of these SAP-PAN composite films suggests that there are more delocalization states and a longer localization length for polarons in the SAP-PAN hyperbranched system than in the RSP-PAN linear system.

Figure 7:
FIG. 7 is a TEM image of a copper phthalocyanine (CuPc) dendrimer.

In another system, the copper phthalocyamine (CuPc) dendrimer of FIG. 6 has a high intrinsic dielectric constant coupled with a small dielectric loss, for example less than 0.01 up to 1 MHz. FIG. 7 shows a TEM image of the CuPc dendrimer. A time-resolved spectroscopy measurement shows the optical behavior of this CuPc dendrimer. It is believed that these behaviors are related to electronic (polaronic) delocalization in the system. While not limiting as to any particular theory, it is believed that the super-conjugation effect from oxygen atom and the increase of system packing through the self-assembling of phthalocyanine rings indicate that polaron hopping and polaron tunneling between phthalocyanine rings may occur.

Steady-state absorption and emission spectra of the CuPc solution are shown in FIG. 8. UV-visible absorption spectra are recorded with an Agilent Technologies 8453 spectrophotometer, and the fluorescence spectra are measured with a Shimadzu RF-1501 spectrofluorophotometer.

Four main UV-Vis adsorption bands are visible in the spectrum. The strong adsorption peaks are dominated by Soret bands, B and Q band, which are characteristics of general phthalocyanine compounds. The absorption at 336 nm is assigned to B band ($\pi$-$\pi^*$ transitions of the macrocycle). Precedent to B band peak, the other two absorption peaks in UV range may be assigned to N (305 nm, d-$\pi$) and C (259 nm, d-$\pi^*$) bands, respectively. A strong Q-band adsorption peak is observed at 678 nm and attributed to the $\pi$-$\pi^*$ transition on the phthalocyanine macrocycle, similar to published spectroscopic feature of CuPc rings. Accompanying the Q-band, there is a relatively weak peak, seen as a shoulder, which appears at 624 nm and is potentially assigned to metal-to-ligand charge transfer.

As shown in FIG. 8 input, a weak emission peak is observed when excited at 624 nm, which appears to confirm metal-to-ligand charge transfer to the band at 624 nm in this dendrimer. Moreover, no emission is observed at an excitation in higher energy bands. For example, when excited at B band or at 400 nm, no emission is observed by the steady state measurement. The emission spectrum at 624 nm may indicate a symmetry breaking after the excitation which agrees with the observation of femtosecond fluorescence dynamics illustrated in FIG. 9. The modeling results show that the fluorescence decay of this dendrimer appears to possess two components, including a fast component in a time scale of 120 fs, which is within the range of IRF. Initially, the fluorescence decays fast with an anisotropy residue of 0.2, which indicates that the excitation appears to be transferred to other rings; otherwise, a residue value of 0.1 in this planar structure would be be otherwise observed. In addition, it appears that the electron hopping process occurs in this dendrimer system. The slow component was in a time scale of 3 ps, which may contribute to electron hopping process between neighboring CuPc rings in the excited states. All above characteristics shown in CuPc dendrimer spectra indicate non-radiated relaxation pathways, for instance, charge transfer process involved.

Time-of-flight measurements to investigate the electron mobility and the effect of temperature and electric field on the mobility of CuPc dendrimer. This information provides more understanding of the intrinsic charge transport mechanisms in CuPc dendrimer. CuPc dendrimer is dissolved in DMAc solution with a concentration of 1 g/mL first, then the CuPc/DMAc solution is cast on a silicon wafer (a thickness of 500 μm) to obtain a film with a thickness of 4-5 μm.

A typical transient current at an applied field of 5V at several different temperatures is depicted in FIG. 10 on a linear scale. The transient current signal at room temperature follows a plateau region after a fast decay, then slowly tails off, which appears to show the characteristic of non-dispersive charge carrier transport. However, an apparent transition from non-dispersive to dispersive charge carrier transport occurs when the temperature decreases, which indicates that the disorder increases as temperature increases in the dendrimer system. While not limiting, it is believed that the dispersive charge transport may originate from the hopping between localized states. For these typical transient curves, the mobility can be calculated by equation 1.

$$\mu = \frac{d^2}{t_{tr} \cdot V} \quad \text{Equation 1}$$

In equation 1, $\mu$ is the mobility, d is the thickness of the film, $t_{tr}$ is the charge carrier transit time and V is the applied electric field. In accordance with certain aspects of the present disclosure, the dielectric materials can have a charge carrier mobility in the order of about $10^{-4}$ cm$^2$/V·s.

In FIG. 11, the temperature dependence of the mobility is illustrated. The measurements are carried out with different electric fields, 5V and 12V respectively. Generally, at high temperatures, thermal excitation of the carriers to the band edges is possible for a Pc semiconductor and extended-states conductivity can occur; and at low temperature less thermal energy is available, hopping may dominate. Thus, a high mobility at higher temperature is typically observed for various conventional materials. However, in contrast, a negative temperature dependence is observed in this dendrimer system. This non-Arrhenius behavior may originate from the positional dielectric disorder. When temperature decreased, due to the self-organization of the Pc planar structures, a tight stacking of CuPc rings may become possible, which may shorten the hopping distance of the polaron between the CuPc rings in the system. Besides, when the distance between CuPc rings becomes short enough (<5 Å), polaron tunneling may occur at a very low temperature. The two alternative processes are illustrated in FIGS. 12A and 12B, which appear to indicate that the super-linear power law relationship of AC conductance (given by expression $\sigma_{AC}=A+B\cdot\omega^s$ where A and B are constants related to the zero frequency conductivity and s is a fitting parameter) by yielding an s value of 1.7. As transport sites are believed to lie on the $\pi$ orbitals of the CuPc rings, and any changes in the organizational structure within the amorphous film may affect the intermolecular distance and mutual orientations, thus, it may have a strong effect on the electron mobility of this CuPc dendrimer.

If the temperature dependence is replotted in an Arrhenius format, as illustrated in FIG. 13, non-Arrhenius behavior is observed. When the temperature decreased from 200K to 20K, only a three-fold increase was observed, indicating a weak temperature dependence on mobility. Extrapolating to the limit 1/T→∞ based on the Arrhenius law fitting, $\mu_0$ with a value of $2.27 \times 10^{-4}$ cm$^2$/V·s is found with 5V applied field. The weak temperature dependence may indicate that the polaron tunneling becomes more dominate at low temperature, which is also indicated by the apparent saturation at low temperature shown in FIG. 13. Furthermore, the activation energies derived from the fitting of data in FIG. 13 at two different applied fields shows that the activation energy decreases at low electric field (with a value of 0.0106 eV at 5V applied field and a value of 0.0168 eV at 12V applied field respectively). This decrease in activation energy appears to indicate that more hopping sites are available at a low electric field, therefore a high mobility can be expected at low electric field.

FIG. 14 shows an applied field strength dependence of the charge mobility in the dendrimer film having a thickness of about 4 μm. It is apparent that the mobility follows a typical Poole-Frenkel-like field dependence. The slope of the electric field dependence decreases with the rising of temperature (from 20 K to RT, the slope drops from −1.41578 to −1.7867), which indicates that the mobility becomes a less strongly positive function of field and satisfies the prediction from disorder formalism. Typical Poole-Frankel dependence of the mobility on the electric field has no correlation with the electrode type, thus may be associated with the charge carriers and the positional disorder of hopping sites, such as observed in other organic materials like polythiophenes. In contrast to the observed field dependence characteristic in the phthalocyanine monomer film, a negative dependence occurs where there is high mobility at low electric field, suggesting the disappearance of hyperelectronic polarization in a weak field. Also, a larger degree of positional disorder at high electric field may be occurring.

Time-of-flight mobility measurements are performed as follows. The CuPc dendrimer/DMAC solution is cast on silicon wafer (about 500 μm). Then it is sandwiched between gold electrodes using vacuum deposition. A nitrogen laser at 337 nm with a 10 ns pulse width is used to excite the transient current. An electric field is applied across the sample by applying a potential difference between the electrodes. The charge carrier mobility is measured by the time-of-flight (TOF) technique.

TOF signals of the CuPc dendrimer of the present disclosure feature characteristics of Gaussian transport, as described by Bassler's uncorrelated Gaussian disorder model (UGDM). The main feature of UGDM is the non-Arrhenius dependence of the mobility on the temperature, as a consequence of polaron hopping, in agreement with the Ac conductance analysis of this dendrimer system.

The CuPc dendrimer system appears to have non-Arrhenius and Poole-Frenkel behaviors. The non-dispersive to dispersive transformation is believed to occur when the temperature decreases, due to the self-organization of CuPc rings, creating more polaron hopping, even polaron tunneling pathways. The time-of-flight measurements demonstrate fast movement of the carriers in the system (under sub microsecond with not so high drain voltage) and the significant carrier mobility (about $10^{-4}$ cm$^2$/v·s), showing strong and fast dielectric response in this dendrimer system. The negative electric field dependence appears to be explained by large degree of positional disorder. Thus, the CuPc dendrimers have impressive dielectric response attributed to polaron hopping and tunneling charge transport mechanisms.

Charge transfer processes of organic dielectric materials comprising a branched and/or hyperbranched macromolecule having delocalized electrons are characterized as follows. Intra-molecular and possibly inter-grain charge transfer processes are believed to dominate the conductivity properties in the organic dielectric materials. As described, long range polaron delocalization appears to be important for enhancing the high frequency dielectric response in most high dielectric all-organic materials. Intra-molecular electronic delocalization processes may give rise to a long range displacement of electrons. In some cases, the entire localization length of a conjugated macromolecule may be affected by the electronic polarization due to the strong charge transfer character, which is believed to be the case for the microcrystalline SAP-PAN system disclosed. The localization length can be connected with important factors such as structure homogeneity as well as the solid-state (crystal) packing in the conjugated bulk materials. The hyperbranched SAP-PAN may have domain sizes as large as 208 nm, while for the nano-crystalline RSP-PAN may have a domain size of about 8 nm. All of these factors may lead to the observed increased localization length in the hyperbranched structure of the organic materials, when compared with the linear RSP-PAN system.

In a band-structure analysis of the organic dielectric material having a hyperbranched macromolecule (e.g., SAP-PAN), a delocalization state may exist at the Fermi level. Polaron delocalization may be offset by disorder and a balance between the metallic and insulating ground states. In this case, the electronic delocalization appears to be dependent on the weakest charge transfer step in the organic conductor. This delocalization is dominated by an inter-grain charge transfer process, which is in effect an intra-chain delocalization. The SAP-PAN system has a more metallic character with the planarity of the hyperbranched structure and with the larger crystalline domain than a linear PAN. This intra-chain charge delocalization may extend to several domains and these properties may be due to the mesoscopic metallic state in the system. In this regard, this state may be characterized by measurements of variable-temperature electron paramagnetic resonance (VT-EPR).

Figure 5:
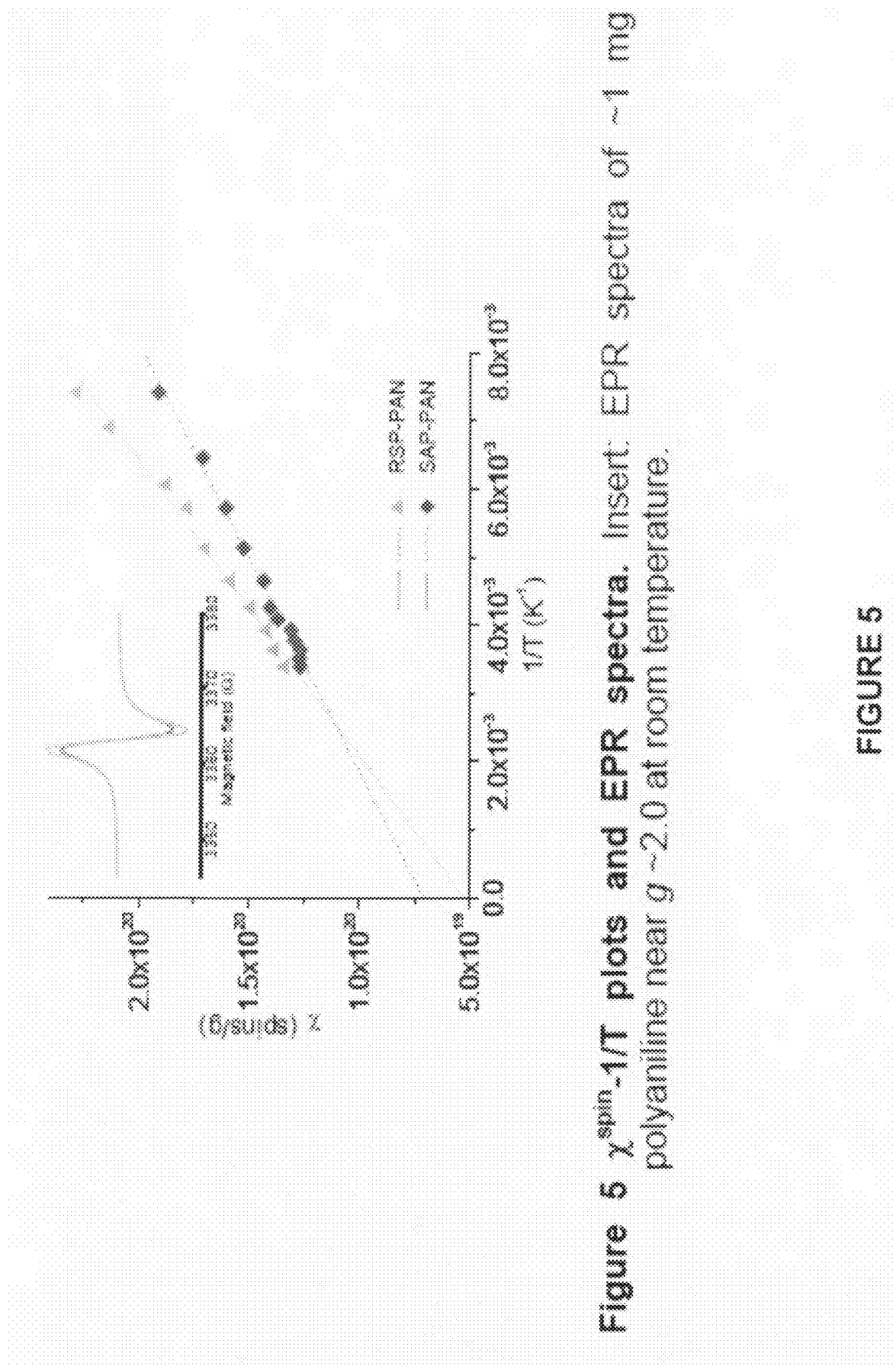

Magnetic properties of organic dielectric materials are characterized as follows. EPR results show that the polyanilines (SAP-PAN and RSP-PAN) have almost the same g value of 2.003. The spectral line-width ($\Delta H_{pp}$) is found to be 2.58 G and 2.82 G for RSP-PAN and SAP-PAN at a modulation of 1G and at room temperature (FIG. 5, insert). SAP-PAN shows a spin susceptibility of $1.27*10^{20}$ spins/g [about $0.95*10^{-4}$ emu/mol 2-ring unit; "mol 2-ring unit" refers mole of the PAN segment (FIG. 1B)], and RSP-PAN exhibited that of $1.52*10^{20}$ spins/g (about $1.13*10^{-4}$ emu/mol 2-ring unit) at room temperature. The line-width reflects both the spin-spin interaction of the conducting electron and the localized spins on localized polarons in the surrounding disordered regions. $\Delta H_{pp}$ is also related to the density of the states at the Fermi level, i.e., the density of the delocalization states. A large $\Delta H_{pp}$ value may suggest a higher density of states at the Fermi level.

FIG. 5 shows a plot of the spin susceptibility as a function of the inverse temperature. Fitting the data with a linear function gives an intercept of $7.07*10^{19}$ spins/g (about $5.29*10^{-5}$ emu/mol 2-ring unit) for the SAP-PAN, while a value of $5.22*10^{19}$ spins/g (about $3.88"10^{-5}$ emu/mol 2-ring unit) is obtained for RSP-PAN. The EPR signal includes all the contributions from all spin carriers (polarons). If a polaron has the character of a Pauli spin, its magnetic susceptibility should be independent of the temperature. However, the magnetic susceptibility of a polaron with a Curie spin behavior should be dependent on temperature. Again, a conductive system with diamagnetic properties possibly possesses carriers without spins, such as regular ions. Thus, the spin susceptibility and intercept value, obtained from the VT-EPR measurements, provide information on the nature of the electronic conduction process.

In general, the observed magnetic susceptibility ($X^{spin}$) in VT-EPR measurements can be expressed as follows: $X^{spin}=X^{pauli}+X^{curie}$; where $X^{pauli}$ is the Pauli susceptibility for delocalized spin with metallic character, and $X^{curie}$ is the Curie susceptibility for localized spin. The $X^{pauli}$ may be obtained from the intercept in the plot of $X^{spin}=(X^{pauli}+X^{curie})$ versus the inverse of temperature(T) or from the extrapolated value in the plot of $X^{spin}$ versus T. This is found to be about $5.29*10^{-5}$ emu/mol 2-ring unit for SAP-PAN and about $3.88*10^{-5}$ emu/mol 2-ring unit for RSP-PAN. Finally, the $X^{curie}$ can be given as $X^{curie}=X^{spin}-X^{pauli}$. Again, the total density of states $N(E_F)$ (both signs of spin) at the Fermi level can be determined $X^{pauli}=(\mu_B)^2 \cdot N(E_F)$, where $\mu_B$ denotes the Bohr magneton ($9.27402*10^{-21}$ erg/0e). The magnetic parameters of these polyanilines can be estimated by the spin susceptibility and intercept values from the VT-EPR experiments. These parameters are summarized in Table 1.

TABLE 1

Magnetic Properties and Carrier Types of the Two Polyaniline systems.*

| | $\chi^{spin}/\times 10^{-4}$ Emu/mol 2-ring | $\chi^{pauli}/\times 10^{-5}$ emu/mol 2-ring | Curie constant/ emu · K/mol 2-ring | $N(E_F)/$ State/eV 2-ring | $n_s^{Curie}/$ State/2-ring |
|---|---|---|---|---|---|
| SAP-PAN | 0.95 | 4.68 | 0.013 | 1.46 | 0.035 |
| RSP-PAN | 1.13 | 3.88 | 0.020 | 1.20 | 0.053 |

*Curie spin concentration $n_s^{curie}$ is obtained at room temperature in term of $\chi^{curie} = n_s^{curie} \cdot (\mu_B)^2/k_B T$, where $k_B$ indicates Boltzmann constant $1.38066 * 10^{-23}$ J/K.

Table 1 shows a higher Pauli susceptibility in the hyperbranched SAP-PAN system than in the RSP-PAN system. The density of states [$N(E_F)$] at the Fermi level and the Pauli susceptibility showed similar magnitudes as those known for PAN. The higher density of states $N(E_F)$ and higher Pauli spin susceptibility in the SAP-PAN system suggests that there are more delocalized polarons in the SAP-PAN system in comparison to the RSP-PAN system. Alternately, the hyperbranched structure of SAP-PAN may not only provide an increased electronic conjugation and a large intramolecular delocalization length, but may also give rise to polaron tunneling between metallic domains that increases the polaron delocalization length in the whole system. Thus, the larger dielectric response of the SAP-PAN is most likely due to polaron delocalization, which is related to the higher density states $N(E_F)$ and longer delocalization length in the SAP-PAN system. The delocalization mechanism may be attributed to both intra-molecular and inter-grain charge transfer in the system as mentioned above. A larger spin susceptibility of RSP-PAN than that of SAP-PAN likewise suggests that there are more carriers in the RSP-PAN than in the SAP-PAN.

The SAP-PAN hyberbranched system has an increase in both the density of states $N(E_F)$ and the Pauli spin susceptibility. The SAP-PAN system has more delocalized polarons in comparison to the linear RSP-PAN system which accounts for the enhanced dielectric response at higher frequencies. Such a large-range polaron delocalization is a way to enhance high frequency dielectric response in organic dielectric materials. Such high frequency dielectric response can be accomplished by deriving molecular systems where intra-molecular delocalization processes are prominent and give rise to long range displacements of electrons in the system. In systems with strong charge transfer character, the polarization may be delocalized along the entire length or dimension of the macromolecule.

In some embodiments, the organic dielectric material comprises a planar branched and/or hyperbranched macromoleculeic structure having a relatively large crystalline domain. For example, such crystalline domains are greater than or equal to 10 nm, optionally greater than or equal to 25 nm, optionally greater than or equal to 50 nm, optionally greater than or equal to 75 nm, optionally greater than or equal to 100 nm, and in some cases greater than or equal to 200 nm. In some embodiments, the organic dielectric material comprises a hyperbranched polyaniline that possesses a higher dielectric constant at higher frequencies than a comparative linear polyaniline polymer. Such branched and/or hyperbranched organic dielectric materials include both bulk and polymeric guest/host materials. A hyperbranched polyaniline system's dielectric and conductive properties via intra-molecular polaron (charge) delocalization provides desirable properties for dielectric materials. Such polymer systems increase the density of states and the length of delocalization polarons via conjugated hyperbranched structures and are highly desirable materials for fast, responsive high dielectric constant all-organic materials for capacitor applications.

The examples and other embodiments described herein are exemplary and not intended to be limiting in describing the full scope of compositions and methods of the technology. Equivalent changes, modifications and variations of specific embodiments, materials, compositions and methods may be made within the scope of the present technology, with substantially similar results.

What is claimed is:

1. An electrical device comprising two electrodes and an organic dielectric material disposed between the electrodes, the organic dielectric material comprising a branched or hyperbranched macromolecule having delocalized electrons, wherein said organic dielectric material has a dielectric response of greater than or equal to about 8 and a dielectric loss of less than or equal to about 0.01 in the presence of a polarization level of 1 V having a frequency of greater than or equal to about 1 MHz.

2. The electrical device of claim 1, wherein the organic dielectric material is operable to provide a majority of a dielectric activity between the electrodes.

3. The electrical device of claim 1, wherein the organic dielectric material is operable to provide substantially all of a dielectric activity between the electrodes.

4. The electrical device of claim 1, wherein the organic dielectric material is operable to provide all of a dielectric activity between the electrodes.

5. The electrical device of claim 1, wherein the branched or hyperbranched macromolecule is selected from the group consisting of polyaniline, a phthalocyanine dendrimer, polyacetylene, polypyrrole, polythiophene, polyfluorene, poly(3-alkylthiophene), polytetrathiafulvalenes, polynaphthalenes, poly(p-phenylene sulfide), poly(para-phenylene vinylene), mixtures thereof, and mixed copolymers thereof.

6. The electrical device of claim 1, further comprising at least one additional material mixed with the organic dielectric material.

7. The electrical device of claim 6, wherein the additional material is a polymer having substantially no dielectric activity.

8. The electrical device of claim 6, wherein the additional material is poly(ethylmethacrylate-co-methyl methacrylate).

9. The electrical device of claim 6, wherein the additional material is an inorganic material, silicon, or a silicon compound.

10. The electrical device of claim 6, wherein the additional material is a metal or metal compound.

11. The electrical device of claim 10, wherein the metal is copper.

12. The electrical device of claim 6, wherein the additional material is a dopant.

13. The electrical device of claim 6, wherein the additional material is an organic liquid medium.

14. The electrical device of claim 1, wherein the organic dielectric material is operable at a frequency of greater than or equal to about 1 KHz.

15. The electrical device of claim 1, wherein the electrodes are plates.

16. The electrical device of claim 1, wherein the electrical device is a capacitor.

17. An energy storage device comprising:
two electrodes;
an organic dielectric material disposed between the two electrodes, the organic dielectric material comprising a branched or hyperbranched macromolecule having delocalized electrons, wherein said organic dielectric material has a dielectric response of greater than or equal to about 8 and a dielectric loss of less than or equal to about 0.01 in the presence of a polarization level of 1 V having a frequency of greater than or equal to about 1 MHz; and
an electric potential between the two electrodes.

18. The electrical device of claim 17, wherein the organic dielectric material is operable to provide substantially all of a dielectric activity between the electrodes.

19. A method of storing an electrical charge comprising establishing an electrical potential across an organic dielectric material disposed between two electrodes, the organic dielectric material comprising a branched or hyperbranched macromolecule having delocalized electrons, wherein said organic dielectric material has a dielectric response of greater than or equal to about 8 and a dielectric loss of less than or equal to about 0.01 in the presence of a polarization level of 1 V having a frequency of greater than or equal to about 1 MHz.

20. The electrical device of claim 19, wherein the organic dielectric material is operable to provide substantially all of a dielectric activity between the electrodes.

21. An electrical device comprising two electrodes and an organic dielectric material disposed between the electrodes, the organic dielectric material comprising a branched or hyperbranched macromolecule having delocalized electrons, wherein the branched or hyperbranched macromolecule is selected from the group consisting of polyaniline, polyacetylene, polypyrrole, polythiophene, polyfluorene, poly(3-alkylthiophene), polytetrathiafulvalenes, polynaphthalenes, poly(p-phenylene sulfide), poly(para-phenylene vinylene), mixtures thereof, and mixed copolymers thereof.

22. The electrical device of claim 21, wherein the branched or hyperbranched macromolecule is selected from the group consisting of polyacetylene, polypyrrole, polythiophene, polyfluorene, poly(3-alkylthiophene), polytetrathiafulvalenes, polynaphthalenes, poly(p-phenylene sulfide), poly(para-phenylene vinylene), mixtures thereof, and mixed copolymers thereof.

* * * * *